United States Patent
Sakai et al.

(10) Patent No.: US 6,948,382 B2
(45) Date of Patent: Sep. 27, 2005

(54) ANGLE DETECTION DEVICE AND TORQUE SENSOR INCORPORATING ANGLE DETECTION DEVICE

(75) Inventors: Atsuo Sakai, Okazaki (JP); Jiro Nakano, Okazaki (JP); Tsutomu Matsumoto, Anjo (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 41 days.

(21) Appl. No.: 10/721,508

(22) Filed: Nov. 26, 2003

(65) Prior Publication Data

US 2004/0112148 A1 Jun. 17, 2004

(30) Foreign Application Priority Data

Nov. 27, 2002 (JP) ........................................ 2002-343820

(51) Int. Cl.[7] ................................................. G01L 3/02
(52) U.S. Cl. ................................................. 73/862.326
(58) Field of Search ..................... 73/862.325, 862.326, 73/862.193, 862.08

(56) References Cited

U.S. PATENT DOCUMENTS 5,522,269 A * 6/1996 Takeda et al. ......... 73/862.333
5,646,496 A 7/1997 Woodland et al.
5,760,562 A 6/1998 Woodland et al.

FOREIGN PATENT DOCUMENTS

| EP | 0 567 683 | 11/1993 |
|----|-----------|---------|
| EP | 1 211 493 | 6/2002 |
| JP | 5-264292 | 10/1993 |

* cited by examiner

Primary Examiner—Max Noori
Assistant Examiner—Corey D. Mack
(74) Attorney, Agent, or Firm—Oblon, Spivak, McClelland, Maier & Neustadt, P.C.

(57) ABSTRACT

An angle detection device that accurately detects a rotational angle even if the ratio of an detection voltage relative to an excitation voltage of a resolver fluctuates. The angle detection device includes an angle detector and a controller connected to the angle detector. The angle detector includes an excitation coil, which is arranged on a predetermined rotary shaft and supplied with excitation voltage, and a pair of detection coils. Each detection coil is arranged near the excitation coil to induce detection voltage when excitation voltage excites the excitation coil. The detection voltages of the detection coils have different phases. A controller calculates the rotational angle of the excitation coil with the detection voltages induced to the detection coils. Further, the controller includes a correction unit for correcting the amplitude of the excitation voltage to maintain each of the induced detection voltages at a predetermined value.

15 Claims, 5 Drawing Sheets

Reduction Gear9

ANGLE DETECTION DEVICE AND TORQUE SENSOR INCORPORATING ANGLE DETECTION DEVICE

CROSS-REFERENCE TO RELATED APPLICATIONS

This application is based upon and claims the benefit of priority from the prior Japanese Patent Application No. 2002-343820, filed on Nov. 27, 2002, the entire contents of which are incorporated herein by reference.

BACKGROUND OF THE INVENTION

The present invention relates to an angle detection device for detecting a rotational angle of a rotary shaft or the like and to a torque sensor incorporating such an angle detection device.

Japanese Laid-Open Patent Publication No. 05-264292 describes an example of an angle detection device 100 that is known in the prior art. As shown in FIG. 1, the angle detection device 100 includes a resolver 101, which is connected to a rotation shaft, and a controller 102, which calculates a rotational angle θ of the rotation shaft from an output signal of the resolver 101.

The resolver 101 includes an excitation coil WE and detection coils WA and WB for two phases (i.e., phase A and phase B). The excitation coil WE is fixed to the rotation shaft so that the excitation coil WE and the rotation shaft are pivotal relative to the detection coils WA and WB of two phases. The axis of the detection coil WA is perpendicular to the axis of the detection coil WB.

The excitation coil WE has one end that is grounded and another end that is connected to the controller 102 via a differential amplifier 103. The detection coils WA and WB each have one end that is grounded and another end that is connected to the controller 102 via respective differential amplifiers 104 and 105. The controller 102 includes a D/A converter 106, A/D converters 107 and 108, and a central processing unit (CPU) 109. The CPU 109 includes an excitation amplitude signal calculator 110, an output table 111, an amplitude calculator 112, and a rotational angle calculator 113.

In accordance with an excitation synchronizing signal (command) from a timing generator (not shown) of the CPU 109, the excitation amplitude signal calculator 110 generates an excitation amplitude signal DE and sends the excitation amplitude signal DE to the D/A converter 106 via the output table (buffer) 111. The D/A converter 106 converts the excitation amplitude signal DE to an analog signal, or an excitation voltage VE. The excitation voltage VE is amplified by the differential amplifier 103 and applied to the excitation coil WE of the resolver 101. When the excitation coil WE is excited, output signals (detection voltages) VA and VB are respectively induced in the detection coils WA and WB. The detection signal VA is a SIN phase, and the detection signal VB is a COS phase.

The detection signals VA and VB are amplified by the differential amplifier 104 and 105 and sent to the A/D converters 107 and 108, respectively. The A/D converters 107 and 108 convert the detection signals VA and VB to digital signals DA and DB, respectively, and send the digital signals DA and DB to the CPU 109. In accordance with a sampling request signal from the timing generator, the A/D converters 107 and 108 respectively sample and convert the detection signals VA and VB to digital signals DA and DB and send the digital signals DA and DB to the amplitude calculator 112 of the CPU 109.

Based on the digital signals DA and DB, the amplitude calculator 112 calculates a SIN phase amplitude (amplitude of detection signal VA) and a COS phase amplitude (amplitude of detection signal VB). Then, the amplitude calculator 112 sends the SIN phase amplitude and the COS phase amplitude to the rotational angle calculator 113. The rotational angle calculator 113 calculates the rotational angle θ from the SIN phase amplitude and the COS phase amplitude.

The angle detection device 100 is used with another angle detection device to configure a torque sensor that detects steering torque in, for example, an electric power steering apparatus. In other words, two angle detectors are used to detect the rotational angle θ of an input shaft located on a steering wheel side and the rotational angle θ of an output shaft located on the steering gear side. The steering torque applied to the steering wheel is then obtained from the difference between the two rotational angles θ.

However, the angle detection device 100 of the prior art has a shortcoming. In the resolver 101, the excitation current of the excitation coil WE relative to a predetermined excitation voltage VE fluctuates according to conditions such as the ambient temperature or the temperature of the excitation coil WE. This causes fluctuation in the amplitude of the detection signals VA and VB of the resolver 101.

More specifically, when the temperature rises and increases the resistance of the excitation coil WE, the excitation current of the excitation coil WE corresponding to the excitation voltage VE decreases. Thus, the amplitudes of the detection signals VA and VB induced in the secondary side detection coils WA and WB also decrease. This decreases the accuracy of the angle detection device 100 for detecting the rotational angle θ.

The amplitude calculator 112 of the CPU 109 retrieves the detection signals VA and VB via the A/D converters 107 and 108 for a predetermined number of times and calculates the amplitudes of the detection signals VA and VB using least squares. A decrease in the amplitudes of the detection signals VA and VB reduces the resolution of the A/D converters 107 and 108. This further reduces the amplitude calculation accuracy of the amplitude calculator 112 and the rotational angle θ calculation accuracy of the rotational angle calculator 113. Thus, when using the angle detection device 100 as the torque sensor, abnormal noise or vibrations may be produced by an increase in the ambient temperature or the temperature of the excitation coil WE.

SUMMARY OF THE INVENTION

One aspect of the present invention is an angle detection device for use with a rotary shaft. The angle detection device has an angle detector including an excitation coil, with the excitation coil arranged on the rotary shaft and supplied with excitation voltage, and a pair of detection coils, with each detection coil being arranged near the excitation coil to induce detection voltage when excitation voltage excites the excitation coil. The detection voltages of the pair of detection coils have different phases. A controller is connected to the angle detector for calculating the rotational angle of the excitation coil from the detection voltages induced in the detection coils. The controller includes a correction unit for correcting the amplitude of the excitation voltage to maintain each of the induced detection voltages at a predetermined value.

Another aspect of the present invention is a torque sensor for use with an input shaft and an output shaft. The torque sensor includes a torsion bar having a spring constant connected between the input shaft and the output shaft. A first angle detection device detects a rotational angle of the input shaft. A second angle detection device detects a rotational angle of the output shaft. A calculation unit calculates a torsion amount of the torsion bar from the deviation between the rotational angle of the input shaft detected by the first angle detection device and the rotational angle of the output shaft detected by the second angle detection device. The calculation unit also calculates the torque applied to the input shaft based on the torsion amount and the spring constant of the torsion bar. The first angle detection device includes a first angle detector having a first excitation coil, with the first excitation coil arranged on the input shaft and supplied with a first excitation voltage, and a pair of first detection coils, with each detection coil being excited by the first excitation coil to induce first detection voltage. The first detection voltages of the pair of first detection coils have different phases. A controller is connected to the first angle detector to calculate the rotational angle of the first excitation coil from the first detection voltage induced in each of the first detection coils. The controller includes a correction unit for correcting the amplitude of the first excitation voltage to maintain each pf the first detection voltages of the first angle detector at a predetermined value. The second angle detection device includes a second angle detector having a second excitation coil, with the second excitation coil arranged on the output shaft and supplied with a second excitation voltage, and a pair of second detection coils, with each detection coil being excited by the second excitation coil to induce second detection voltage. The second detection voltages of the pair of second detection coils have different phases. A controller is connected to the second angle detector to calculate the rotational angle of the second excitation coil from the second detection voltage induced in each of the second detection coils. The controller includes a correction unit for correcting the amplitude of the second excitation voltage to maintain each of the second detection voltages of the second angle detector at a predetermined value.

A further aspect of the present invention is a method for detecting the rotational angle of a rotary shaft. The method includes applying excitation voltage having a predetermined amplitude to an excitation coil arranged on the rotary shaft, inducing detection voltages having different phases in a pair of detection coils that are arranged near the excitation coil by exciting the excitation coil, calculating a rotational angle of the rotary shaft from the detection voltages, and correcting the amplitude of the excitation voltage to maintain each of the detection voltages at a predetermined value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
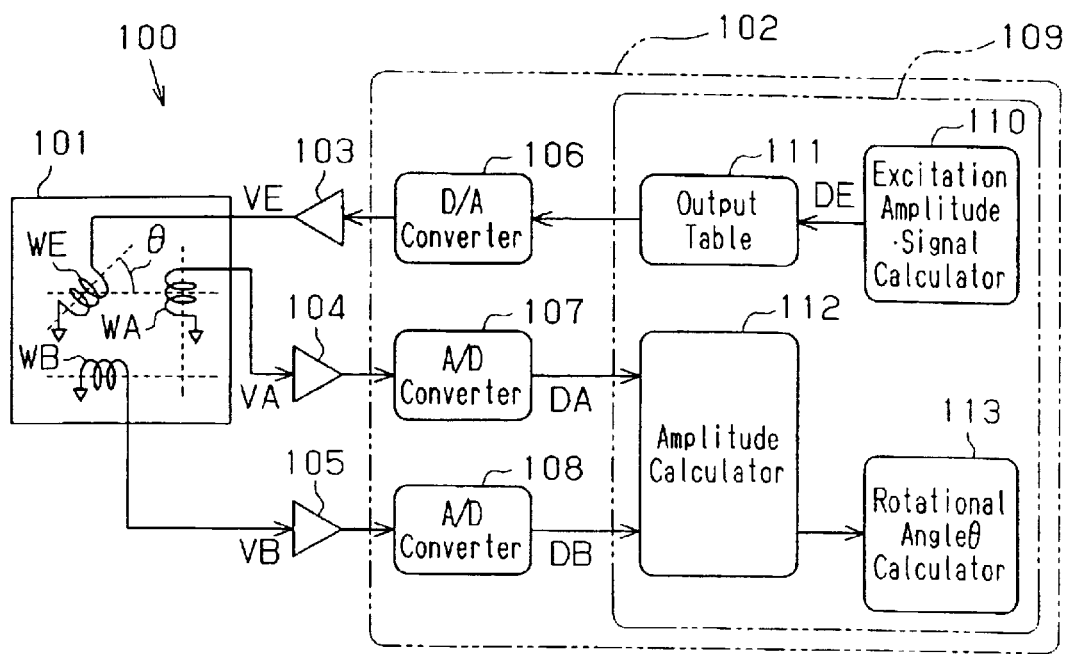
FIG. 1 is a schematic block diagram of an angle detector in the prior art.

In the drawings, like numerals are used for like elements throughout.

Figure 2:
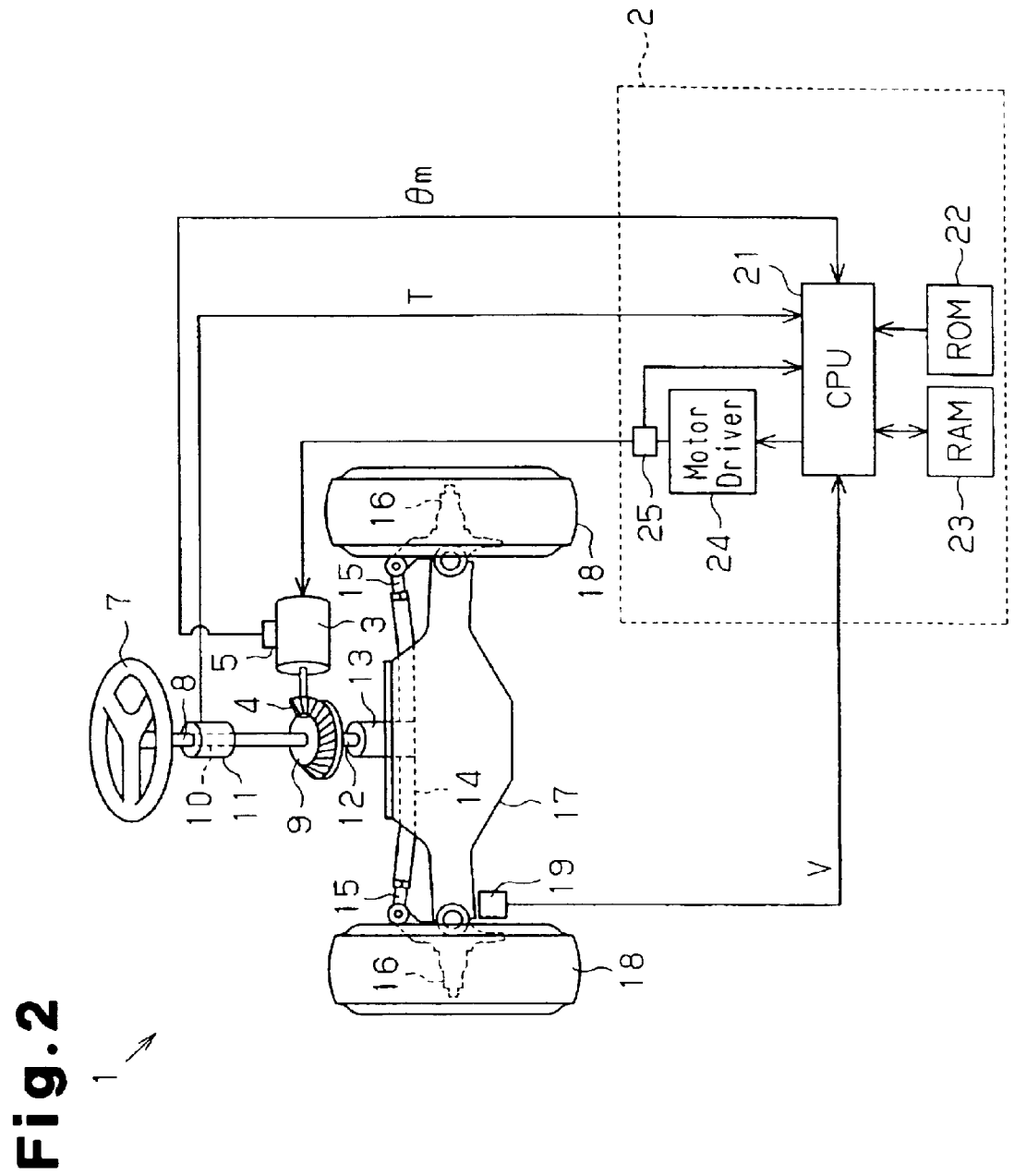
FIG. 2 is a schematic diagram of an electric power steering apparatus including a torque sensor according to a preferred embodiment of the present invention.

FIG. 2 is a schematic diagram of an electric power steering apparatus that incorporates a torque sensor 11 according to a preferred embodiment of the present invention. As shown in FIG. 2, the electric power steering apparatus 1 includes an electric power steering controller (hereafter referred to as a controller) 2, and an electric motor 3 controlled by the controller 2. The electric motor 3 has an output shaft fixed to the gear 4. The electric motor 3 is, for example, a three-phase synchronous permanent magnet motor (brushless motor) and has a motor rotational angle sensor (e.g., Hall element) 5.

The motor rotational angle sensor 5 detects the rotational angle of the electric motor 3 and sends the detection result (motor rotational angle signal) to the controller 2. The rotational angle of the electric motor is an electric angle representing the magnetic pole of the rotor of the electric motor 3 (i.e., rotational angle em of rotor).

A steering shaft 8 has one end connected to a steering wheel 7 and another end fixed to a reduction gear 9. The reduction gear 9 is engaged with a gear 4 of an electric motor 3.

The steering shaft 8 includes a torsion bar 10 on which a torque sensor 11 is arranged. The torque sensor 11 detects the steering torque T applied to the steering wheel 7 from the torsion amount of the torsion bar 10 when the driver operates the steering wheel 7 and rotates the steering shaft 8. The steering torque T is sent to the controller 2.

The reduction gear 9 is fixed to a pinion gear 13 by means of a pinion shaft 12. The pinion gear 13 is engaged with a rack 14. A tie rod 15 is fixed to each of the two ends of the rack 14. A knuckle arm 16 is pivotally connected to the distal portion of each tie rod 15. A pivotal cross member 17 is connected between the two knuckle arms 16. A front wheel 18 is mounted on each knuckle arm 16.

A vehicle velocity sensor 19 is arranged on each of the left and right front wheels (in FIG. 2, the vehicle velocity sensor 19 is shown on only one of the front wheels 18). Each vehicle velocity sensor 19 detects the wheel speed of the corresponding wheel (i.e., the number of rotations of the wheel per unit time, or the rotation speed) and sends the detection result (i.e., wheel speed signal) to the controller 2. The controller 2 calculates the vehicle velocity V based on the wheel speed signal received from each vehicle velocity sensor 19.

When the driver turns the steering wheel 7, the steering shaft 8 is rotated. The rotation is transmitted to the rack 14 via the torsion bar 10, the pinion shaft 12, and the pinion gear 13 to move the rack 14. This changes the direction of the two front wheels 18.

In this state, the controller 2 controls the electric motor 3 in accordance with the steering torque T and the vehicle velocity V to generate a predetermined auxiliary steering torque (assist torque). The rotation of the reduction gear 9 is transmitted to the reduction gear 9 via the gear 4. The reduction gear 9 reduces the speed of the rotation and then further transmits the rotation to the pinion shaft 12 and the pinion gear 13. The rotation of the pinion gear 13 is transmitted to the rack 14 to move the rack 14. In this manner, an assist torque is added when turning the steering wheel 7 to change the directions of the front wheels 18.

The electric configuration of the controller 2 will now be discussed. Referring to FIG. 2, the controller 2 includes a central processing unit (CPU) 21, a read only memory (ROM) 22, a random access memory (RAM) 23, a motor driver 24, and a current sensor 25. Among the three phases of excitation currents Iu, Iv, and Iw supplied to the electric motor 3 from the motor driver 24, the current sensor 25 detects the U-phase excitation current Iu and the V-phase excitation current Iv.

The ROM 22 stores control programs, which include a basic assist control program and a steering wheel returning program, various types of data, and various types of characteristic maps. The various maps are obtained through experiments conducted on each vehicle model and through known theoretical calculations. The maps include, for example, a basic assist torque map, which is used to obtain basic assist current from the vehicle velocity Va and the steering torque T, and a map for obtaining a steering wheel returning command current from the vehicle velocity V, the steering angular velocity, and the absolute steering angle.

The RAM 23 is used by the CPU 21 as a data work area for executing the control programs written to the ROM 22 to perform various types of calculations. The RAM 23 temporarily stores calculation results of the calculations performed by the CPU 21.

The torque sensor 11, the vehicle velocity sensor 19, the motor driver 24, the motor rotational angle sensor 5, and the current sensor 25 are each connected to the CPU 21 via an input/output interface (not shown). Based on the information from the sensors 5, 11, 19, and 25, the CPU 21 executes the basic assist control program and the steering wheel return control program.

The CPU 21 uses the basic assist map to calculate the basic assist current, which corresponds to the vehicle velocity V and the steering torque T. Then, the CPU 21 calculates a PI control value from the difference between the basic assist current and the actual motor drive current, which is obtained from the motor drive current sensor (not shown). The CPU 21 performs PWM calculation with the PI control value and provides the PWM calculation result (motor control signal) to the motor driver 24. In accordance with the motor control signal, the motor driver 24 supplies the electric motor 3 with basic assist current (i.e., three phases of excitation current) through excitation current paths of the three phases. The electric motor 3 applies basic assist force to the steering wheel 7 in accordance with the basic assist current.

Figure 3:
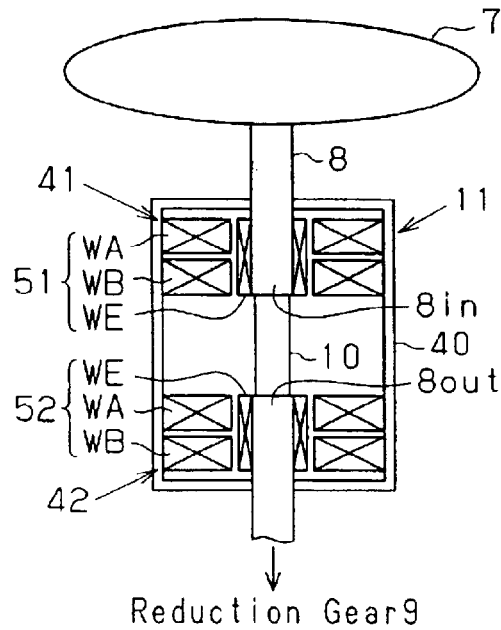
FIG. 3 is a schematic diagram of the torque sensor of FIG. 2.

The torque sensor 11 will now be discussed in detail. As shown in FIG. 3, the torque sensor 11 includes a sensor housing 40, a first angle detection device 41, and a second angle detection device 42. The sensor housing 40 covers the torsion bar 10. In the sensor housing 40, the first and second angle detection devices 41 and 42 are fixed to the steering shaft 8 with the torsion bar 10 located in between. The first angle detection device 41 is arranged at the input side of the steering shaft 8 (i.e., the side closer to the steering wheel 7). The second angle detection device 42 is arranged at the output side of the steering shaft 8 (i.e., the side closer to the reduction gear 9). The input side of the steering shaft 8 defines an input portion 8in, and the output side of the steering shaft 8 defines an output portion 8out.

When the steering wheel 7 is turned and torque is applied to the steering shaft 8, the torsion bar 10 is twisted. This causes relative displacement between the input portion 8in of the steering shaft 8 and the output portion 8out of the steering shaft 8. The first angle detection device 41 detects the rotational angle of the input portion of the torsion bar 10. The first angle detection device 41 detects the rotational angle at the input side of the torsion bar 10 and sends the input side rotational angle of the torsion bar 10 to the controller 2. The second angle detection device 42 detects the rotational angle at the output side of the torsion bar 10 and sends the output side rotational angle to the controller 2. The controller 2 calculates the torsion amount of the torsion bar 10 from the deviation of the two rotational angles. Then, the controller 2 calculates the steering torque T applied to the steering wheel 7 from the torsion amount and a spring constant of the torsion bar 10.

The first and second angle detection devices 41 and 42 will now be discussed. Referring to FIG. 3, the first angle detection device 41 includes a first resolver (angle detector) 51 connected to the input portion 8in of the steering shaft 8. The second angle detection device 42 includes a second resolver (angle detector) 52 connected to the output portion 8out of the steering shaft 8.

The first resolver 51 includes detection coils WA and WB for two phases (phase A and phase B) that are fixed to the inner surface of the sensor housing 40. The first resolver 51 also includes an excitation coil WE fixed to the input portion 8in of the steering shaft 8. The first resolver 51 includes detections coil WA and WB for two phases (phase A and phase B) that are fixed to the upper inner surface of the sensor housing 40. The second resolver 52 includes detection coil WA and WB (secondary coils) for two phases (phase A and phase B) that are fixed to the lower inner surface of the sensor housing 40. The second resolver 52 also includes an excitation coil WE fixed to the output portion Bout of the steering shaft 8.

Figure 4:
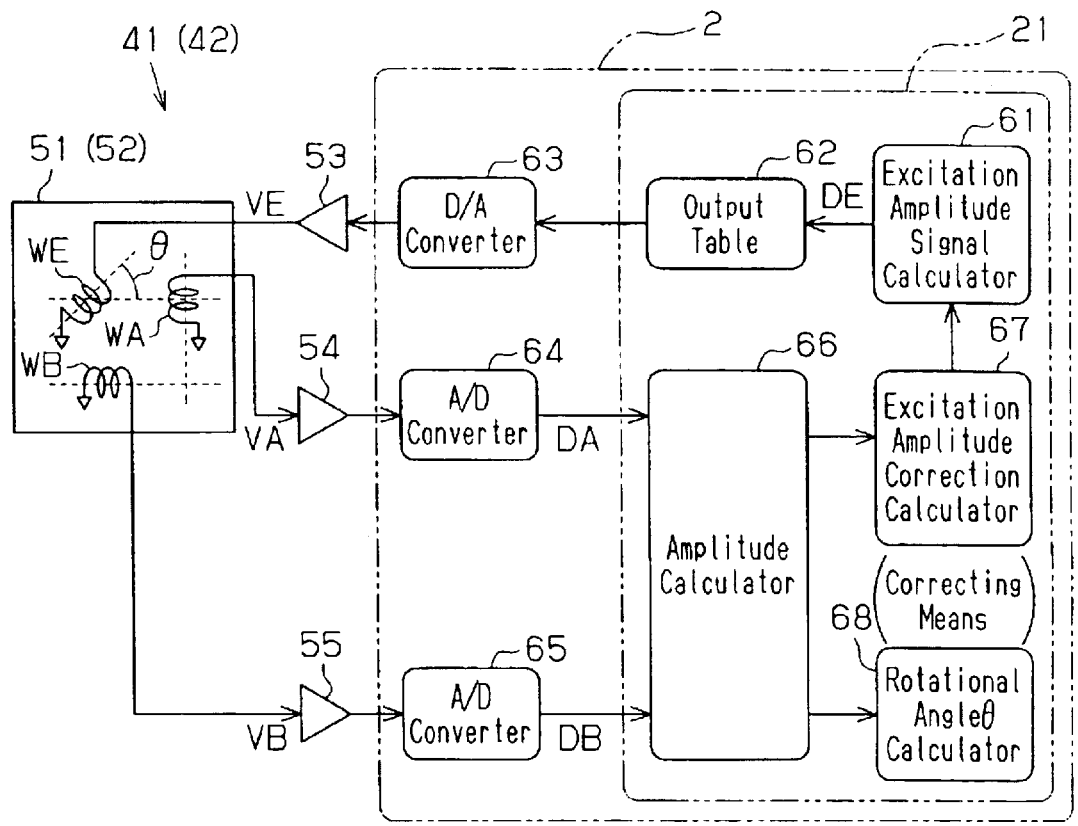
FIG. 4 is a schematic block diagram of an angle detector employed in the preferred embodiment.

Referring to FIG. 4, the axis of the detection coil WA is perpendicular to the axis of the detection coil WB. The excitation coils WE of the first and second resolvers 51 and 52 are rotatable relative to the detection coils WA and WB. The excitation coils WE of the first and second resolvers 51 and 52 each have a grounded end and another end connected to the controller 2 via the differential amplifier 53. The detection coils WA and WB for the two phases in the first and second resolvers 51 and 52 each respectively have one grounded end and another end connected to the controller 2 via differential amplifiers 54 and 55.

When a predetermined excitation voltage VE is applied to the excitation coils WE from the controller 2, detection signals (voltages) VA and VB are induced in the detection coils WA and WB. The controller 2 calculates the rotational angle θ of a rotary shaft in each of the first and second resolvers 51 and 52 from the detection signals VA and VB.

A resolver signal process performed by the controller 2 will now be discussed with reference to the block circuit diagram of FIG. 4 illustrating the functions of the CPU 21. The resolver signal process is performed in accordance with the various control programs stored in the ROM 22. Each parameter represents a corresponding signal.

The CPU has an excitation amplitude signal calculator 61 for generating an excitation amplitude signal DE, which is a digital signal, in accordance with an excitation synchronization signal (command) provided from a timing generator (not shown). The excitation amplitude signal calculator 61 sends the excitation amplitude signal DE to a D/A converter 63 via an output table (buffer) 62. The D/A converter 63 converts the excitation amplitude signal DE to an analog signal and sends the analog signal to the differential amplifier 53. The differential amplifier 53 amplifies the analog signal to generate excitation voltage VE and applies the excitation voltage VE to the excitation coils WE of the first and second resolvers 51 and 52.

When the excitation coil WE is excited, detection signals VA and VB (voltages) corresponding to the rotational angle θ are induced in the detection coils WA and WB of the first and second resolvers 51 and 52.

The detection signals VA and VB are respectively amplified by the differential amplifiers 54 and 55 and then sent to A/D converters 64 and 65. In accordance with a sampling request signal from the timing generator (not shown) of the CPU 21, the A/D converters 64 and 65 respectively sample the detection signals VA and VB and convert the detection signals VA and VB to digital signals DA and DB. The A/D converters 64 and 65 respectively send the digital signals DA and DB to an amplitude calculator 66 of the CPU 21.

The amplitude calculator 66 calculates the amplitudes of the detection signals VA and VB from the digital signals DA and DB. In the preferred embodiment, the amplitude of the detection signal VA is referred to as SIN phase amplitude Rsin, and the amplitude of the induced detection signal is referred to as COS phase amplitude Rcos. The amplitude calculator 66 sends the calculated SIN phase amplitude Rsin and the COS phase amplitude Rcos to an excitation amplitude correction calculator 67 and a rotational angle calculator 68.

Figure 6:
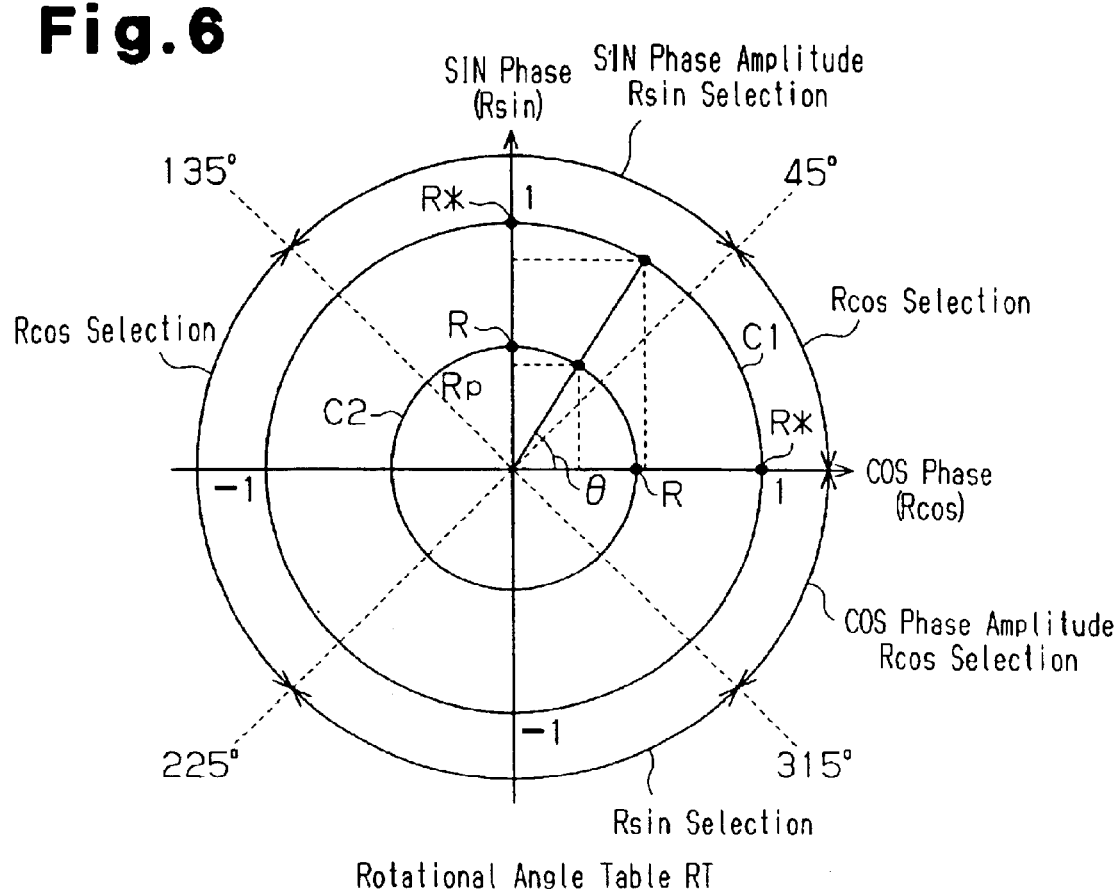
FIG. 6 is a rotation angle table used in the excitation amplitude correction process of FIG. 5.

The rotational angle calculator 68 refers to a rotational angle table RT of FIG. 6 and calculates the rotational angles θ of the first and second resolvers 51 and 52 based on the values of the SIN phase amplitude Rsin and the COS phase amplitude Rcos. The rotational angle table RT is a two dimensional table and stored in the ROM 22. In the rotational angle table RT, the X axis represents the COS phase amplitude and the Y axis represents the SIN phase amplitude.

In the rotational angle table RT, for example, range −1 to 1 including the values of which the SIN phase amplitude Rsin and the COS phase amplitude Rcos may take is divided into 1024. The indexes of 0 to 1023 are sequentially allocated to the values of the divided SIN phase amplitude Rsin and the COS phase amplitude Rcos. The addresses designated by the sets of indexes of the values of the SIN phase amplitude Rsin and the COS phase amplitude Rcos are used to read data. This enables the rotational angle calculator 68 to determine the rotational angles θ of the rotary shafts of the first and second resolvers 51 and 52 without performing complicated calculations.

In accordance with the various programs stored in the ROM 22, such as an excitation amplitude correction calculation process program, the excitation amplitude correction calculator 67 corrects the amplitude of the excitation voltage (excitation amplitude) based on the SIN phase amplitude Rsin or the COS phase amplitude Rcos. As a result, even if the detection voltages VA and VB of the first and second resolvers 51 and 52 fluctuate due to changes in the ambient temperature or changes in the temperature of the excitation coil WE, the excitation amplitude is fed back to increase or decrease excitation current and obtain the predetermined detection voltages VA and VB. The excitation amplitude correction calculator 67 sends the calculation result (corrected excitation amplitude) to the excitation amplitude signal calculator 61.

When the timing generator issues an excitation synchronization signal (command), the excitation amplitude signal calculator 61 generates the next excitation amplitude signal DE in accordance with the corrected excitation amplitude.

The excitation amplitude correction process of the excitation amplitude correction calculator 67 will now be discussed with reference to the flowchart of FIG. 5. The process illustrated in the flowchart of FIG. 5 is executed in accordance with the various types of control programs stored in the ROM 22, such as an excitation amplitude correction calculation program.

Figure 5:
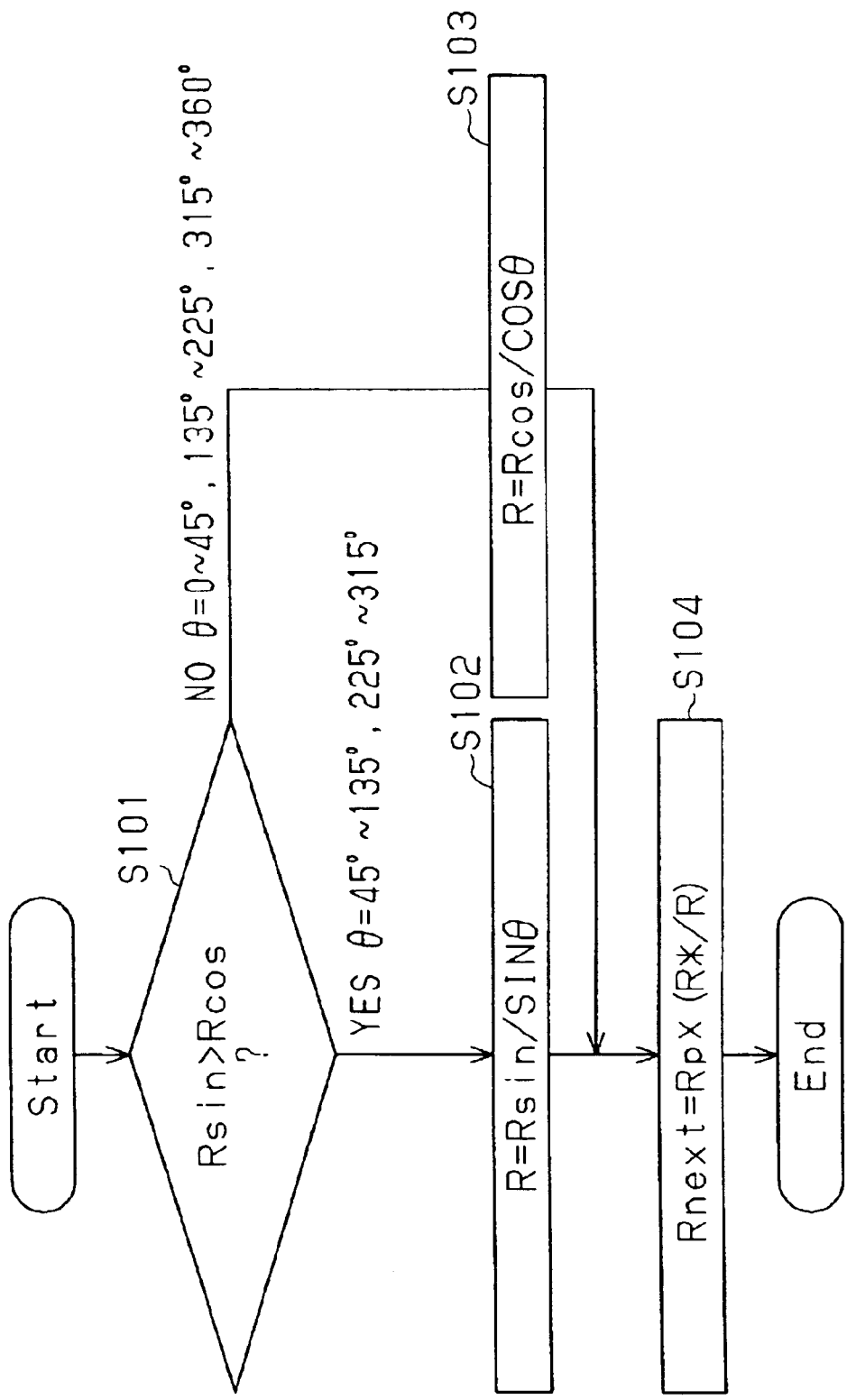
FIG. 5 is a flowchart showing an excitation amplitude correction process executed by the angle detector of FIG. 5.

In step S101 of FIG. 5, the excitation amplitude correction calculator 67 retrieves the SIN phase amplitude Rsin and the COS phase amplitude Rcos from the amplitude calculator 66 to compare the SIN phase amplitude Rsin and the COS phase amplitude Rcos. As shown by the rotational table angle RT of FIG. 6, the SIN phase amplitude Rsin is greater than the COS phase amplitude Rcos when the rotational angle θ of the first and second resolvers 51 and 52 is in the range of 45 to 315 degrees and in the range of 225 to 315 degrees. When the rotational angle θ is in the range of 0 to 45 degrees, 135 to 225 degrees, and 315 to 360 degrees, the SIN phase amplitude Rsin is less than the COS phase amplitude Rcos.

When it is determined that the SIN phase amplitude Rsin is greater than the Rcos phase amplitude (YES in step S101), the excitation amplitude correction calculator 67 calculates the signal amplifier R in accordance with equation (1) in step S102.

$$R = R\sin/\text{SIN }\theta \quad (1)$$

When it is determined that the SIN phase amplitude Rsin is less than the COS phase amplitude Rcos (NO in step S101), the excitation amplitude correction calculator 67 calculates the signal amplitude R in accordance with equation (2) in step S103.

$$R = R\cos/\text{COS }\theta \quad (2)$$

The signal amplitude R may be obtained from only one of the SIN phase amplitude Rsin and the COS phase amplitude Rcos. However, for example, SIN θ is zero when the rotational angle θ is zero, and COS θ is zero when the rotational angle θ is 90 degree. In such cases, the signal amplitude R cannot be calculated. Accordingly, step S101 is performed so that the signal amplitude R can be calculated.

Then, the excitation amplitude correction calculator 67 assigns the signal amplitude R, which was calculated in step S102 or step S103, the present excitation amplitude Rp, and the target signal amplitude R* to equation (3) and calculates the next excitation amplitude Rnext (S104). The present excitation amplitude Rp is the amplitude value of the present excitation amplitude signal DE. The target signal amplitude R* is the maximum signal amplitude R that should be output (i.e., the maximum value of the SIN phase amplitude Rsin or the COS amplitude Rcos).

$$Rnext = Rp \times (R^*/R) \quad (3)$$

The excitation amplitude correction calculator 67 sends the calculated next excitation amplitude Rnext (corrected excitation amplitude) to the excitation amplitude signal calculator 61. The excitation amplitude signal calculator 61 generates the excitation amplitude signal DE in accordance with the next excitation amplitude Rnext.

In this case, the range of the target signal amplitude R* is indicated by circle C1 in FIG. 6, and the range of the signal amplitude R is indicated by circle C2 in FIG. 6. The excitation amplitude correction calculator 67 corrects the amplitude value of the excitation amplitude signal DE so that circle C2 matches circuit C1. In other words, the excitation amplitude correction calculator 67 corrects the amplitude of the excitation voltage VE so that the present signal amplitude R matches the target signal amplitude R*.

An example will now be given in which the value of the signal amplitude R is affected by a temperature rise and decreased to half the target signal amplitude R* (R*=2R). In this case, due to equation (3), the next excitation amplitude Rnext becomes equal to a value that is two times the present excitation amplitude Rp (Rnext=2RP). When the timing generator of the CPU 21 outputs the excitation synchronization signal, the excitation amplitude signal calculator 61 multiplies the excitation amplitude signal DE by two times and sends the corrected amplitude value to the output table 62. As a result, the next signal amplitude R is approximated with the target signal amplitude R*.

Subsequently, the excitation amplitude correction calculator 67 repeats the processes of steps S101 to S104 in predetermined control cycles.

In this manner, when the signal amplitude R has not reached the target signal amplitude R* due to a decrease in the excitation current, which results from an increase in the ambient temperature or an increase in the temperature of the excitation coil WE, the present excitation amplitude Rp (i.e., amplitude of the excitation amplitude signal DE and ultimately the amplitude of the excitation voltage VE) is corrected so that the signal amplitude R matches the target signal amplitude R*. In other words, the amplitude of the excitation voltage is fed back to increase or decrease the excitation current and generate the predetermined detection signals VA and VB. As a result, the rotational angles θ of the first and second resolvers 51 and 52 are accurately detected.

The torque sensor 11 of the preferred embodiment has the advantages described below.

(1) The torque sensor 11 includes a correction unit for correcting the amplitude of the excitation voltage VE, or the excitation amplitude, to hold the values of the detections signals VA and VB generated by the first and second resolvers 51 and 52 at predetermined values. More specifically, one of the detection signals (detection voltages) VA and VB for the two phases is selected in accordance with the rotational angle θ of the excitation coil WE. Then, the ratio of the amplitude of the detected voltage for the selected phase relative to the target signal amplitude R* is obtained. The present excitation amplitude Rp is corrected based on the ratio. Thus, even if the excitation current of the first and second resolvers 51 and 52 fluctuates due to the ambient temperature, the rotational angle θ of the first and second resolvers 51 and 2 are still accurately detected. This also reduces differences (changes) in the detection accuracy of the rotational angle θ.

(2) One of the detection signals VA and VB of the two phases is selected based on the rotational angle θ of the excitation coil WE. More specifically, the SIN phase amplitude Rsin is selected when the rotational angle θ is in the ranges of 45 to 135 degrees and 225 to 315 degrees. The COS phase amplitude Rcos is selected when the rotational angle θ is in the ranges of 0 to 45 degrees, 135 to 225 degrees, and 315 to 360 degrees. Thus, for example, SIN θ is zero when the rotational angle θ is zero, and COS θ is zero when the rotational angle θ is 90 degree. In such cases, the signal amplitude R cannot be calculated. However, step S101 of FIG. 5 is performed so that the signal amplitude R can be calculated.

(3) In the rotational angle calculator 68, the rotational angle θ is obtained from the rotational angle table RT of FIG. 6. Thus, the rotational angle θ is obtained without performing complicated calculations.

(4) The torque sensor 11 includes the first and second resolvers 51 and 52. This ensures the torque detection accuracy of the torque sensor 11. This also reduces differences (changes) in the torque detection accuracy of the torque sensor 11.

It should be apparent to those skilled in the art that the present invention may be embodied in many other specific forms without departing from the spirit or scope of the invention. Particularly, it should be understood that the present invention may be embodied in the following forms.

In the preferred embodiment, a Hall element is used to detect the electric angle (rotational angle θ) of the electric motor 3. However, the first resolver 51 or the second resolver 52 may be attached to an electric motor 3, and the first resolver 51 or the second resolver 52 may obtain a rotational angle θm of the electric motor 3. That is, the first resolver 51 or the second resolver 52 may be used as a motor rotational angle sensor.

Steps S102 and S103 of FIG. 5 may be eliminated. In other words, the next excitation amplitude may be obtained from only the SIN phase amplitude Rsin and the rotational angle θ or from the COS phase amplitude Rcos and the rotational angle θ. In this case, the process of step S101 is unnecessary.

The present examples and embodiments are to be considered as illustrative and not restrictive, and the invention is not to be limited to the details given herein, but may be modified within the scope and equivalence of the appended claims.

What is claimed is:

1. An angle detection device for use with a rotary shaft, the angle detection device comprising:
    an angle detector including an excitation coil, with the excitation coil arranged on the rotary shaft and supplied with excitation voltage, and a pair of detection coils, with each detection coil being arranged near the excitation coil to induce detection voltage when excitation voltage excites the excitation coil, wherein the detection voltages of the pair of detection coils have different phases; and
    a controller connected to the angle detector for calculating the rotational angle of the excitation coil from the detection voltages induced in the detection coils;
    wherein the controller includes a correction unit for correcting the amplitude of the excitation voltage to maintain each of the detection voltages at a predetermined value.

2. The angle detection device according to claim 1, wherein the correction unit selects one of the detection voltages in accordance with the rotational angle of the excitation coil to obtain the ratio of the amplitude of the selected detection voltage relative to a predetermined target signal amplitude and correct the present amplitude of the excitation voltage with the ratio.

3. The angle detection device according to claim 2, wherein the correction unit calculates a new amplitude of the excitation voltage by multiplying the present amplitude of the excitation voltage by the ratio.

4. The angle detection device according to claim 2, wherein the correction unit compares the amplitudes of the two detection voltages and selects one of the amplitudes according to the comparison result.

5. The angle detection device according to claim 1, wherein the correction unit corrects the present amplitude of the excitation voltage so that excitation current generated by the excitation voltage increases or decreases.

6. A torque sensor for use with an input shaft and an output shaft, the torque sensor comprising:
- a torsion bar having a spring constant connected between the input shaft and the output shaft;
- a first angle detection device for detecting a rotational angle of the input shaft;
- a second angle detection device for detecting a rotational angle of the output shaft; and
- a calculation unit for calculating a torsion amount of the torsion bar from the deviation between the rotational angle of the input shaft detected by the first angle detection device and the rotational angle of the output shaft detected by the second angle detection device and for calculating the torque applied to the input shaft based on the torsion amount and the spring constant of the torsion bar;
- the first angle detection device including:
  - a first angle detector having a first excitation coil, with the first excitation coil arranged on the input shaft and supplied with a first excitation voltage, and a pair of first detection coils, with each detection coil being excited by the first excitation coil to induce first detection voltage, wherein the first detection voltages of the pair of first detection coils have different phases; and
  - a controller connected to the first angle detector to calculate the rotational angle of the first excitation coil from the first detection voltage induced in each of the first detection coils, wherein the controller includes:
    - a correction unit for correcting the amplitude of the first excitation voltage to maintain each of the first detection voltages of the first angle detector at a predetermined value;
- the second angle detection device including:
  - a second angle detector having a second excitation coil, with the second excitation coil arranged on the output shaft and supplied with a second excitation voltage, and a pair of second detection coils, with each detection coil being excited by the second excitation coil to induce second detection voltage, wherein the second detection voltages of the pair of second detection coils have different phases; and
  - a controller connected to the second angle detector to calculate the rotational angle of the second excitation coil from the second detection voltage induced in each of the second detection coils, wherein the controller includes:
    - a correction unit for correcting the amplitude of the second excitation voltage to maintain each of the second detection voltages of the second angle detector at a predetermined value.

7. The torque sensor according to claim 6, wherein the correction unit:
- selects either one of the first detection voltages in accordance with the rotational angle of the first excitation coil, obtains a first ratio of the amplitude of the selected detection voltage relative to a target signal amplitude, and corrects the present amplitude of the excitation voltage applied to the first excitation coil with the first ratio; and
- selects either one of the second detection voltages in accordance with the rotational angle of the second excitation coil, obtains a second ratio of the amplitude of the selected detection voltage relative to the target signal amplitude, and corrects the present amplitude of the excitation voltage applied to the second excitation coil with the second ratio.

8. The torque sensor according to claim 7, wherein the correction unit:
- calculates a new amplitude of the first excitation voltage applied to the first excitation coil by multiplying the present amplitude of the first excitation voltage by the first ratio; and
- calculates a new amplitude of the second excitation voltage applied to the second excitation coil by multiplying the present amplitude of the second excitation voltage by the second ratio.

9. The torque sensor according to claim 6, wherein the correction unit:
- compares the amplitudes of the first detection voltages to select one of the first detection voltages in accordance with the comparison result; and
- compares the amplitudes of the second detection voltages to select one of the second detection voltages in accordance with the comparison result.

10. The torque sensor according to claim 6, wherein the correction unit:
- corrects the present amplitude of the first excitation voltage so that excitation current generated by the first excitation voltage increases or decreases; and
- corrects the present amplitude of the second excitation voltage so that excitation current generated by the second excitation voltage increases or decreases.

11. A method for detecting the rotational angle of a rotary shaft, the method comprising:
- applying excitation voltage having a predetermined amplitude to an excitation coil arranged on the rotary shaft;
- inducing detection voltages having different phases in a pair of detection coils that are arranged near the excitation coil by exciting the excitation coil;
- calculating a rotational angle of the rotary shaft from the detection voltages; and
- correcting the amplitude of the excitation voltage to maintain each of the detection voltages at a predetermined value.

12. The method according to claim 11, wherein said correcting includes:
- selecting one of the detection voltages in accordance with the rotational angle of the excitation coil; and
- correcting the present amplitude of the excitation voltage with a ratio of the amplitude of the selected detection voltage relative to a predetermined target signal amplitude.

13. The method according to claim 12, wherein said correcting the present amplitude of the excitation voltage includes:

calculating a new amplitude of the excitation voltage by multiplying the present amplitude of the excitation voltage by the ratio.

14. The method according to claim 11, wherein said selecting includes:

comparing the amplitudes of the detection voltages to select one of the detection voltages in accordance with the comparison result.

15. The method according to claim 11, wherein said correcting includes:

correcting the present amplitude of the excitation voltage so that excitation current generated by the excitation voltage increases or decreases.

* * * * *